United States Patent [19]

Warnagiris et al.

[11] Patent Number: 4,697,166
[45] Date of Patent: Sep. 29, 1987

[54] METHOD AND APPARATUS FOR COUPLING TRANSCEIVER TO POWER LINE CARRIER SYSTEM

[75] Inventors: Thomas J. Warnagiris; William H. McGinnis, both of San Antonio, Tex.

[73] Assignee: Nippon Colin Co., Ltd., Komaki, Japan

[21] Appl. No.: 896,111

[22] Filed: Aug. 11, 1986

[51] Int. Cl.⁴ .................................. H04M 11/04
[52] U.S. Cl. .................. 340/310 R; 340/310 CP; 340/310 A; 340/538; 375/7; 375/37
[58] Field of Search ........ 340/310 R, 310 A, 310 CP, 340/538; 375/7, 37, 8; 455/7, 14

[56] References Cited

U.S. PATENT DOCUMENTS 3,993,989 11/1976 Held et al. ................. 340/310 R
4,066,912 1/1978 Wetherell .................. 340/310 R
4,097,692 6/1978 Felix ........................ 340/310 R
4,136,319 1/1979 Bourde ...................... 340/310 R Primary Examiner—Donnie L. Crosland
Attorney, Agent, or Firm—Gary W. Hamilton

[57] ABSTRACT

A method and apparatus for efficiently coupling a transceiver to an AC power line transmission system. The preferred embodiment of the coupling system comprises a line coupling network and first and second filter ports. The first filter port is connected to a resonant circuit having bandpass filtering characteristics adapted to the specific needs of the transmitter portion of the transceiver. The second filter port is isolated from the low impedance of the AC power line and is connected to a high quality factor filter having bandpass filtering characteristics adapted to the specific needs of the receiver portion of the transceiver.

11 Claims, 4 Drawing Figures

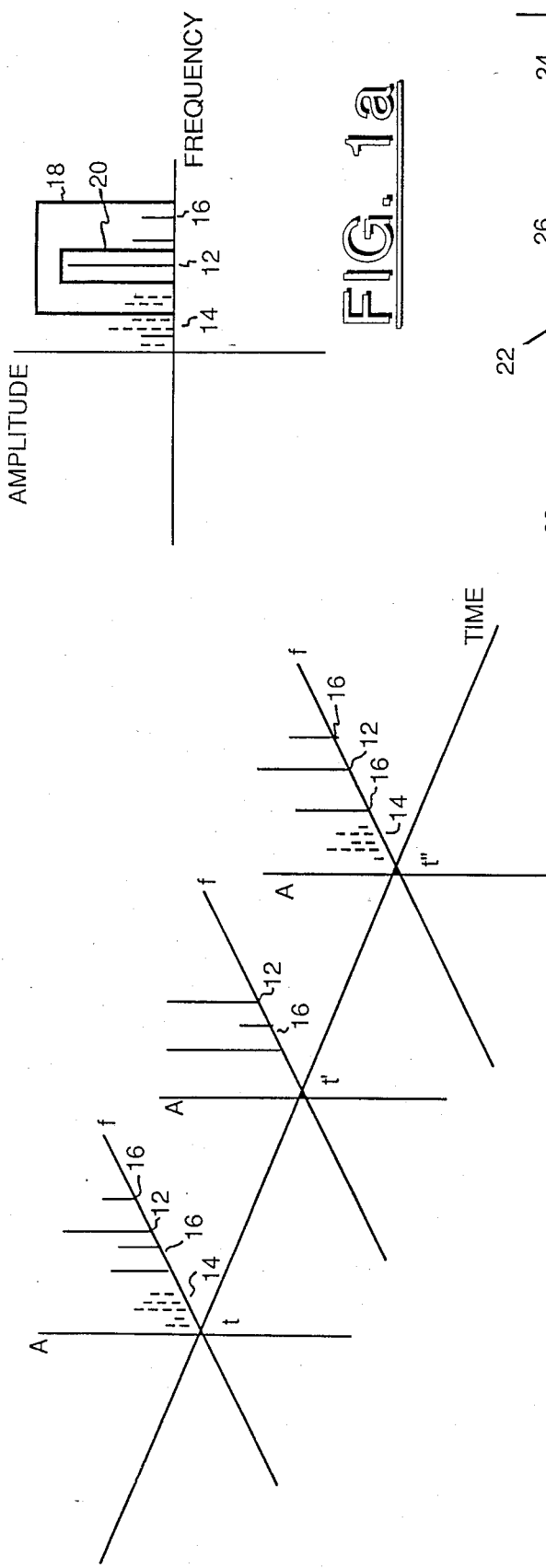
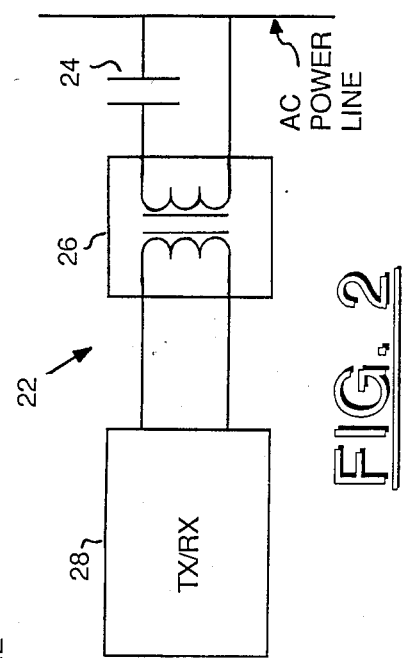

METHOD AND APPARATUS FOR COUPLING TRANSCEIVER TO POWER LINE CARRIER SYSTEM

FIELD OF THE INVENTION

The present invention relates generally to the field of communications and data transmission systems. More specifically, the present invention provides a method and apparatus for efficiently coupling a transceiver to an AC power line.

BACKGROUND

It is often desirable to be able to communicate between a number of stations in the same building without installing a dedicated data transmission network. One approach for achieving such a data link is to use the building's existing power line transmission network. Data transmission systems based on existing power line transmission networks are generally referred to as Power Line Carrier (PLC) systems or Power Line Data Transmission (PLDT) systems.

Most of the previous applications for PLDT systems have involved single station to single station communications. Examples of such systems include intercoms and appliance controllers. In some applications, such as appliance controllers, a number of receivers are connected to the power line, but are controlled by a single transmitter. Systems involving multiple transmitters and multiple receivers have not been used in the past because of a number of difficulties involved in coupling the multiple transmitters and receivers (transceivers) to the power transmission line. In particular, previous systems attempting to employ multiple transceivers have had a very limited range and effectiveness because of line coupling difficulties.

A typical AC power transmission line normally has a very low impedance, on the order of one to ten ohms. The low impedance of the AC line at frequencies usable for communications causes significant difficulties with regard to the filtering of the transmitted and received signals. The low line impedance limits the quality factor (Q) of any filter coupled to the line and thus causes significant degradation of the filter rolloff characteristics. Furthermore, the impedance of the AC line varies significantly with time. This variance in the line impedance tends to change the frequency response of the filters which leads to additional coupling difficulties.

Because of the above-mentioned problems associated with the transmission characteristics of AC power transmission lines, ordinary transceiver filters cannot be effectively adapted to PLDT applications. In particular, the transmitter and the receiver portion of a transceiver have different filtering requirements when used for communications over power lines. In general, the filter used for the transmitter should have a very low loss, while providing moderate rejection and a fairly wide bandwidth. The loss of the transmitter filter must be low because the power requirements needed to overcome loss rise very rapidly and thus quickly become unfeasible. Bandwidth and rejection are not particularly important for a transmitter, with the exception of harmonic rejection and rejection of intermodulation signals.

The receiver portion of the transceiver can withstand a fairly high loss factor, on the order of 20 dB, but the rejection should be as high as possible. The filter loss can be high because the signal to noise ratio of the received signal is limited by the noise present on the power line. The bandwidth requirements of the receiver are set by the frequency requirements of the particular modulation scheme being employed.

Previous coupling circuits for connecting transceivers to power transmission lines typically employ parallel tuned tank circuits comprising a capacitor in series with the secondary winding of a transformer. This type of coupling circuit defines a bandpass filter having a relatively low loss and moderate rejection. While this circuit is suitable for use by the transmitter, it does not meet the filtering requirements of the receiver. Systems using a single coupling circuit of this type for filtering the signals of both the transmitter and the receiver have, therefore, have been ineffective for the reasons discussed above.

SUMMARY OF THE INVENTION

The invention method and apparatus for coupling a PLDT transceiver to an AC power line overcomes the difficulties of previous systems by providing a coupling system which has a single line coupling network and first and second filter ports for providing appropriate signal filter characteristics for the transmitter and receiver portions, respectively, of a transceiver. In the preferred embodiment, the line coupling network is a resonant circuit comprising a capacitor in series connection with the secondary winding of a transformer. The first filter port of the coupling circuit is connected to the primary winding of the transformer. The resonant circuit provides an effective transmitter signal filter having a low loss, moderate rejection and a relatively high bandwidth.

The second filter port of the preferred embodiment is connected to an active filter which is connected in series with a second resonant filter and an isolation resistor connected to the output of the first bandpass filter. Because the isolation resistor provides a comparatively high impedance, the active filter can be adapted to provide the high rejection and other signal filter characteristics needed by the receiver portion of the PLDT transceiver.

BRIEF DESCRIPTION OF THE DRAWINGS

FIG. 1 is a graphical representation of the frequency spectra of signals present on a hypothetical power transmission line over three time intervals.

FIG. 1a is a graphical representation of the frequency spectra of signals present on a power transmission line at one of the time intervals of FIG. 1.

FIG. 2 is a schematic representation of a typical coupling circuit for connecting a PLDT transceiver to an AC power transmission line.

DETAILED DESCRIPTION OF THE PREFERRED EMBODIMENT

Figure 3:
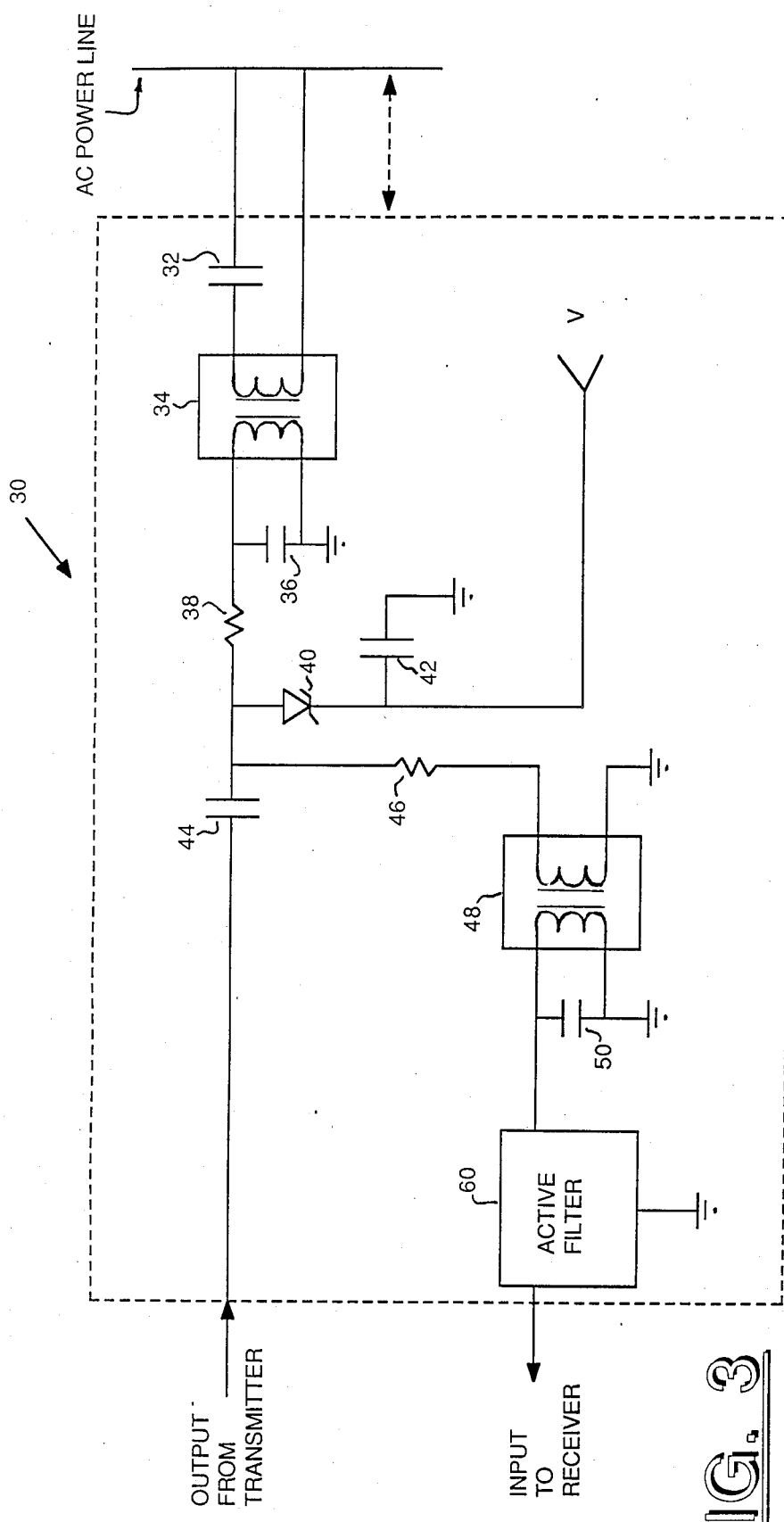
FIG. 3 is a schematic block diagram representation of the preferred embodiment of the coupling apparatus of the present invention.

Referring to the figures in more detail, and to FIGS. 1 and 1a in particular, a graphical representation is shown of the frequency spectra of signals present on a hypothetical AC power transmission line being used as a carrier medium for a PLDT system. As was discussed above, the impedance and noise characteristics of the power line change with time. Referring to FIG. 1, the evolution of the power line frequency spectra can be seen over three time periods, t, t', and t". In each of the three time periods shown, a desired carrier signal 12 is present on the line. In time periods t and t", however, a cluster of undesired noise signals 14 and 14", respectively, are also carried by the line. Such noise signals can arise from a number of factors, such as electric machinery attached to the power line. Other undesired noise signals, such as those illustrated generally by reference number 16, can arise on the line from numerous external sources, such as AM broadcast signals.

The difficulties caused by noise signals such as those illustrated in FIG. 1 can be seen by referring to the frequency spectra shown in FIG. 1a. As was mentioned above, the transmitter and receiver sections of a PLDT transceiver have different filtering requirements. The filter of the transmitter section should have as low a loss as possible, while providing relatively moderate rejection and fairly wide bandwidth. Typical acceptable values for such a filter are 30 dB per octave of rejection and a bandwidth which is 20 percent of the transmitter frequency compared to the modulation frequency. The desired filter characteristics for a transmitter are illustrated graphically by the envelope 18 shown in FIG. 1a.

The receiver filter can have a comparatively large loss factor, e.g. 20 dB, but should have very high rejection. The preferred characteristics of a receiver filter are illustrated graphically by the envelope 20 shown in FIG. 1a.

A typical coupling circuit 22 for connecting a transceiver to a power line is shown schematically in FIG. 2. In most PLDT systems, the coupling circuit 22 is a parallel tuned tank circuit comprising a capacitor 24 and a transformer 26. In this standard coupling system, signals are received from the line and filtered by the same resonant circuit that is used to transmit signals onto the line.

The filtering characteristics of the coupling circuit 22 are generally similar to the characteristics illustrated by the envelope 20 of FIG. 1a. In general, such a coupling circuit is well suited for use by the transmitter portion of a transceiver but is not well suited to the needs of the receiver portion of the transceiver. However, the coupling circuit 22 can be used by both transmitters and receivers in a *PLDT* system with certain compromises. In particular, the conventional coupling circuit 22 can be used in a *PLDT* system in which multiple transceivers are operating on a single carrier frequency using a frequency coded or token passing transmission protocol. The receiver portions of the various transceivers will be compromised, however, because of the failure of the coupling circuit to meet the preferred filtering characteristics discussed above.

The coupling circuit 22 shown in FIG. 2 is entirely unsuitable for PLDT systems in which multiple transceivers are operating on different carrier frequencies. For such systems, the coupling circuit 30 of the preferred embodiment, shown in FIG. 3, offers improved filtering characteristics which meet the specific needs of the transmitter and the receiver of a PLDT transceiver.

The coupling circuit 30 of the preferred embodiment, shown in FIG. 3, comprises a single line coupling network and first and second filter ports. The line coupling network is connected directly to the AC power line. The first and second filter ports are connected to the transmitter and receiver portions, respectively of the PLDT transceiver.

The line coupling network is a tuned tank circuit comprising a capacitor 32 connected in series with the secondary winding of a transformer 34. In the preferred embodiment, the capacitor 32 has a value between 0.1 and 1 microfarad. This capacitor couples the signals to and from the line and isolates the circuit from the high voltage AC current. The center frequency of the tank circuit is determined by capacitor 36 which is connected to the primary winding of the transformer 34. The capacitor 36 and transformer 34 provide a low loss, low Q (e.g., 2) filter having sufficient rejection to meet the needs of the transmitter portion of the PLDT transceiver.

The transmitter and receiver are protected from transient pulses by a protection network comprising resistor 38, zener diode 40 and bypass capacitor 42. High level pulses coupled through the transformer 34 are dissipated in the resistor 38 which limits the amount of current into the diode 40. In the preferred embodiment, the desired pulse dissipation is achieved with a resistor having a resistance of between 1 and 5 ohms. The diode 40, which serves to protect the transmitter and receiver from transient pulses, is biased in its midrange by an appropriate voltage V. A bypass for the diode 40 is provided by capacitor 42, which has a value of 10 microfarads. Capacitor 44, which is connected to the output terminal of the transmitter, provides decoupling for the protection diode 40 and removes any DC signals from the transmitter output.

The second filter port of the invention coupling circuit 30 is connected to an active filter which is connected in series with a resonant circuit and an isolation resistor. The isolation resistor 46, having a preferred valve of approximately 1k ohm, isolates the receiver from the transmitter and low AC line impedance. Further isolation is provided by the resonant circuit comprising transformer 48 and capacitor 50. The center frequency of this circuit is determined by the value of the capacitor 50.

Since the active filter 60 is isolated from the low impedance of the AC line by the isolation resistor 46, it can be designed to have the high Q, narrow bandwidth characteristics needed by the receiver portion of the transceiver. The specific Q needed by the receiver is determined by a number of factors, such as the carrier frequency and the type of modulation scheme being employed. By isolating the active filter from the low impedance of the AC transmission line as discussed above, it is possible to construct a filter having a Q factor of between 10 and 30. An active filter of the type used in the preferred embodiment can be built from readily available operational amplifiers using design techniques which are well known to those skilled in the art.

The invention method and apparatus for coupling a transceiver to a power transmission line offers numerous advantages over previous coupling circuits. By providing separate filter ports for the transmitter and receiver portions of a transceiver, the specific filter requirements for each of these respective system modules can be satisfied. In particular, the isolation of the receiver filter port from the low impedance of the AC transmission line allows the receiver filter to have a high Q, without impeding the performance of the transmitter. By implementing the invention coupling system. it is possible to have a PLDT system which employs multiple transceivers utilizing a number of different carrier frequencies without encountering the difficulties experienced in previous systems.

While the invention method and apparatus for providing an efficient transceiver coupling system for use in power line transmission systems has been described in connection with the preferred embodiment, it is not intended to limit the invention to the specific form set forth herein, but on the contrary, it is intended to cover such alternatives, modifications and equivalents as may included within the scope and spirit of the invention as defined by the appended claims.

We claim:

1. An apparatus for coupling a transceiver to an AC power line, said transceiver comprising a transmitter portion for providing a first data signal at a first frequency and a receiver portion for receiving a second data signal at a second frequency, comprising:

a resonant circuit for coupling said first data signal to said power line and for receiving said second data signal from said power line, said resonant circuit having first and second terminals, said first terminal connected to said power line, said second terminal connected to said transmitter to receive said first data signal therefrom, said resonant circuit defining a first bandpass filter for filtering said first and second data signals;

a second bandpass filter having first and second terminals, said first terminal of said second filter being connected to said second terminal of said resonant circuit to receive said second data signal therefrom, said second terminal of said second filter connected to said receiver; and means for isolating said AC power line and said resonant circuit from said second bandpass filter.

2. An apparatus according to claim 1, said resonant circuit comprising a capacitor and a transformer, said capacitor being connected in series with one winding of said transformer.

3. An apparatus according to claim 3, said means for isolating said resonant circuit comprising a resistor in series with said second terminal of said resonant circuit and said first terminal of said second bandpass filter.

4. An apparatus according to claim 3, said resistor having a resistance value being between ten and one thousand times the impedance of said AC power line.

5. An apparatus according to claim 4, said second bandpass filter having a quality factor of between 10 and 30.

6. An apparatus according to claim 5, said means for isolating said resonant circuit and said second bandpass filter comprising a second resonant circuit in series connection with said resistor and said first terminal of said second bandpass filter, said second resonant circuit comprising a transformer having a capacitor connected to one winding thereof.

7. An apparatus according to claim 6, further including a transient pulse protection network comprising a zener diode and a bypass capacitor connected to said second terminal of said resonant circuit.

8. A method of coupling a transceiver to an AC power line, said transceiver having a receiver portion for receiving a data signal carried on said power line, comprising the steps of:

connecting a first resonant circuit to said AC power line, said resonant circuit defining a first bandpass filter having a low quality factor and being adapted to receive said data signal and produce a second filtered data signal in response thereto;

receiving said second data signal in a second bandpass filter and producing a third filtered data signal, said second filter having a high quality factor and being isolated from said AC power line and said first resonant circuit by a resistor having a resistanceof at least ten times the impedance of said power line; and providing said third signal to the input of said receiver portion of said transceiver.

9. The method according to claim 8, said first resonant circuit comprising a capacitor and a transformer, said capacitor being connected in series with one winding of said transformer, said resonant circuit defining a bandpass filter having a quality factor of approximately 2.

10. The method according to claim 9, said second bandpass filter comprising an active filter having a quality factor of between 10 and 30.

11. The method according to claim 10, said resistor having a resistance value of between ten and one thousand times the impedance of said AC power line.

* * * * *